United States Patent
Camfield et al.

(10) Patent No.: US 11,073,305 B2
(45) Date of Patent: Jul. 27, 2021

(54) SOLAR ENERGY CAPTURE, ENERGY CONVERSION AND ENERGY STORAGE SYSTEM

(71) Applicant: FUTURE ENERGY SOURCE LIMITED, Bournemouth (GB)

(72) Inventors: Tony Camfield, Poole (GB); Zulfiqar Ahmad Khan, Bournemouth (GB); Utku Helvaci, Bournemouth (GB); Zakir Khan, Bournemouth (GB)

(*) Notice: Subject to any disclaimer, the term of this patent is extended or adjusted under 35 U.S.C. 154(b) by 106 days.

(21) Appl. No.: 16/312,546

(22) PCT Filed: Jun. 22, 2017

(86) PCT No.: PCT/IB2017/053737
§ 371 (c)(1),
(2) Date: Dec. 21, 2018

(87) PCT Pub. No.: WO2017/221197
PCT Pub. Date: Dec. 28, 2017

(65) Prior Publication Data
US 2020/0333046 A1    Oct. 22, 2020

(30) Foreign Application Priority Data
Jun. 22, 2016    (GB) ..................... 1610912

(51) Int. Cl.
*F24S 10/75*    (2018.01)
*F24S 80/60*    (2018.01)
(Continued)

(52) U.S. Cl.
CPC ............ *F24S 10/755* (2018.05); *F03G 6/003* (2013.01); *F24S 60/10* (2018.05); *F24S 80/20* (2018.05);
(Continued)

(58) Field of Classification Search
CPC .......... F24S 10/755; F24S 80/60; F24S 60/10; F24S 80/20; F24S 80/50; F03G 6/003; F28D 20/021
See application file for complete search history.

(56) References Cited

U.S. PATENT DOCUMENTS

2011/0017196 A1    1/2011   Bell
2011/0079043 A1*   4/2011   Flynn ................... C07C 43/126
                                                       62/502
(Continued)

FOREIGN PATENT DOCUMENTS

DE    10 2011 083147    3/2013
EP         2703764      3/2014
(Continued)

OTHER PUBLICATIONS

English Translation JP 2004085062A (Year: 2004).*
(Continued)

*Primary Examiner* — Shafiq Mian
(74) *Attorney, Agent, or Firm* — William H. Bollman

(57) ABSTRACT

A solar energy capture, conversion and storage system for use on a roof of a building for capturing and converting incident solar radiation to heat and electricity. The invention provides an optimized solar energy capture and conversion system that monitors immediately available incident radiation comprising a mounting structure which supports a matrix in which is embedded a conduit containing a working fluid. The fluid or fluid mixture includes at least one hydrofluoro-ether (HFE). Valves are arranged to open/close ports which connect the solar energy capture system to either a combined heat/electrical generating system or an energy storage system that incorporates a phase change material to store heat energy. Control of the valves is supervised by an energy management system.

18 Claims, 6 Drawing Sheets

(51) Int. Cl.
    *F24S 60/10*     (2018.01)
    *F24S 80/20*     (2018.01)
    *F24S 80/50*     (2018.01)
    *F03G 6/00*     (2006.01)
    *F28D 20/02*     (2006.01)
    *F24S 80/00*     (2018.01)
    *G06Q 30/02*     (2012.01)
    *G06Q 50/06*     (2012.01)

(52) U.S. Cl.
    CPC .............. *F24S 80/50* (2018.05); *F24S 80/60* (2018.05); *F28D 20/021* (2013.01); *F24S 2010/751* (2018.05); *F24S 2080/03* (2018.05); *G06Q 30/0202* (2013.01); *G06Q 50/06* (2013.01)

(56) References Cited

U.S. PATENT DOCUMENTS

| | | | |
|---|---|---|---|
| 2011/0226780 A1 | 9/2011 | Bell | |
| 2012/0055462 A1* | 3/2012 | Berger | F28D 20/0034 126/678 |
| 2012/0124999 A1* | 5/2012 | Gruss | F24S 10/95 60/641.8 |
| 2012/0145223 A1* | 6/2012 | Weekley | H02S 40/44 136/248 |
| 2013/0255752 A1 | 10/2013 | Escher et al. | |
| 2014/0015324 A1* | 1/2014 | Brennan | H02J 3/381 307/72 |
| 2014/0060046 A1* | 3/2014 | Takahashi | F28D 20/02 60/641.8 |
| 2014/0174084 A1* | 6/2014 | Kontomaris | C09K 5/045 60/651 |
| 2014/0366536 A1* | 12/2014 | Muren | F24S 60/00 60/641.8 |
| 2015/0241137 A1* | 8/2015 | France | F28D 20/023 126/619 |
| 2015/0308750 A1 | 10/2015 | Rice | |
| 2017/0067667 A1* | 3/2017 | Choi | F24S 80/20 |
| 2017/0248338 A1* | 8/2017 | Ray | F24F 11/62 |
| 2018/0195418 A1* | 7/2018 | Gibble | F01K 9/00 |

FOREIGN PATENT DOCUMENTS

| | | | |
|---|---|---|---|
| GB | 2498737 | 7/2013 | |
| JP | 2004 085062 | 3/2004 | |
| JP | 2004085062 A * | 3/2004 | .............. F24S 80/30 |

OTHER PUBLICATIONS

UK Search Report in GB1610912.6, dated Aug. 16, 2016.
PCT International Search Report in PCT/IB2017/053737 dated Sep. 6, 2017.

* cited by examiner

SOLAR ENERGY CAPTURE, ENERGY CONVERSION AND ENERGY STORAGE SYSTEM

FIELD

This invention relates to a solar energy capture, energy conversion and energy storage system. More particularly, but not exclusively the invention relates to a solar energy capture, storage and conversion system adapted to be supported on a roof of a building and to convert incident solar radiation to heat energy and to store latent heat for the purposes of heating and generation of electricity.

BACKGROUND

Fossil fuels are still the main source of energy for human activities. However, it is now generally accepted that use of fossil fuels has many adverse impacts on the environment. For instance, the release of large quantities of $CO_2$ (a major greenhouse gas) is believed to be a cause of a rise in global surface temperature. Concerns also arise as to security of supply of fossil fuels and when fossil fuels will eventually be depleted.

PRIOR ART

Parabolic trough collectors are considered as one of the most viable solar energy capture systems. These are typically employed as part of a system to generate electricity and typically operate at temperature of around 400° C. Heat energy captured can be used to heat a heat engine or steam in a turbine to produce electricity. Well known examples of solar thermal power generation using parabolic trough collectors are the Solar Energy Generating Systems (SEGS) in California. This particular system consists of nine power plants with a total capacity of 354 Megawatts.

Alternatively, low temperature solar thermal power generation, which operates using an organic Rankine cycle (ORC), offers an increasingly promising opportunity, especially for domestic and smaller energy recovery instillations. These solar thermal power generators employ working fluids with lower boiling temperatures than water so allowing them to generate heat and electricity at lower operating temperatures.

ORCs also provide the possibility of decreased plant size and so lower system costs. Therefore, low temperature (stationary collectors) adapted to operate using solar energy can be efficiently utilised in ORC systems for generating both electricity and for heating water and buildings.

Another example of a solar thermal power generator is one which includes a solar collector, a throttling valve, a heat exchanger, a $CO_2$ pump and a cooling tower. These solar thermal power generator systems produced mechanical work and delivered heat energy. The solar collector was suitable for use for heating of $CO_2$ in the cycle up to around 165° C. However, these solar thermal power generators used thermo fluids, such as chlorofluorocarbons (CFCs) and hydrofluorocarbons (HCFCs), which had a negative impact on the environment.

Chlorofluorocarbons (CFCs) and hydrochlorofluorocarbons (HCFCs) are conventional are recognised as ozone depleting substances under the Montreal Protocol. Due to their high ozone depleting potential (ODP) and global warming potential (GWP), CFCs have been phased out and complete phase out of HCFCs is projected by 2030.

Photovoltaic (PV) systems consist of silicon or selenium based semiconductors which absorb solar energy and convert it directly to electricity. Solar PVs have become popular for electricity generation over recent years. However, PV panels have some drawbacks. For instance, PV panels are expensive and have limited efficiency levels ranging from around 12% to 20%. Moreover, conversion of direct electric current (DC) generated from solar PVs to alternating current (AC) requires inverters and other expensive electronic equipment.

Another disadvantage with PV panels is that planning permission is often required in some jurisdictions in order to install the panels as they can have a visual impact in areas where architectural integrity is required. A further drawback with PV panels is that they can become detached in very windy conditions and consequently can cause damage to property and persons.

Hydrofluorocarbons (HCFs) have been used as substitutes for CFCs and HCFCs. Although, HCFs have no ODP value they have high global warming potential.

Solar energy is abundant, free and clean. Solar energy can be utilised via solar photovoltaic cells (PVs) or solar collectors. Concentrating solar collectors provide medium-grade to high-grade useful energy. Solar thermal power systems, using so called flat plate collectors, can be utilised with organic Rankine cycle (ORC) heat recovery and heat pump systems.

ORC heat recovery and heat pumps use organic substances that are able to utilise low grade heat sources, such as solar energy to generate both heat and mechanical energy.

Another example of a solar energy capture system is described in published UK Patent Application GB-A-2 498 737 (Camfield) in which a solar energy capture system includes a loop of continuous pipe which conducts a heat transfer medium, such as water as a working fluid, and a roofing surface. The loop is sandwiched between a support board and the roofing surface. The system has proven to be extremely efficient at entrapping solar energy and transporting heat energy using a working fluid as part of a Rankine cycle.

US Patent Application 2015/308750 (JR Thermal) teaches a two phase heat pump for use in situations where gravity was unable to be used to drive the heat pump. The heat pump in JR Thermal is a closed loop heat transfer comprising a plurality of capillary tubes operating in parallel.

US 2013/0255752 (IBM) teaches a photovoltaic hybrid solar receiver that includes a thermal collector and a photovoltaic module.

An aim of the present invention is to provide an improved solar capture, conversion and storage system that is cheap and easy to manufacture.

Another aim of the present invention is to provide an improved solar energy capture, conversion and storage system that is straightforward to install and deploy; and which is easy to maintain and to repair; and which maximizes thermal efficiency of the working fluid.

A yet further object of the invention is to provide an improved solar energy capture, conversion and storage that is modular and can be installed in stages and so is suitable for use as a retro-fit.

SUMMARY OF THE INVENTION

According to a first aspect of the present invention there is provided a solar energy capture, energy conversion and energy storage system comprising: a mounting structure which supports an embedded conduit which in use receives a working fluid which includes at least one hydro-fluoro-ether; first and second valves are operative to open/close first and/or second ports in at least one fluid pathway leading from the conduit to an electricity generating system and/or to an energy storage system, the working fluid in the generating system passes through a heat exchanger in order to transfer its heat to drive a generator (dynamo); the energy storage system includes: a sealed vessel for containing a phase change material (PCM), which in use receives and stores heat energy, and a continuous fluid pathway leads from a vessel inlet to a vessel outlet, the continuous fluid pathway is arranged in the form of a plurality of substantially parallel sections of fluid pathway, at the end of each parallel section of fluid pathway there is a U-shaped return which returns the working fluid along an adjacent fluid pathway so that in use working fluid passing along the continuous fluid pathway transfers its heat energy to the PCM; and an energy management system controls operation of the first and second valves so as to selectively generate electricity or to store heat.

An advantage of the present invention is that it is not concerned with the ability to cool or to pump a working fluid in different or varying orientations or where space is limited; rather the present invention seeks to maximise solar energy extraction and optimise subsequent energy usage and storage.

Ideally the energy management system includes: a processor which is adapted to monitor the level of incident solar radiation and levels of electricity being generated, so that an amount of energy that is stored is in dependence of available energy and/or expected demand of energy.

Preferably the processor determines what percentage of incident solar energy is converted to electricity, for immediate use and what percentage of incident solar energy is stored in the energy storage system.

Ideally the processor determines what amount of the electricity is used to charge one or more rechargeable batteries.

The inventors have realised that hydro-fluoro-ethers (HFEs) and hydro-fluoro-olefins (HFOs) have no harmful effect on the environment and have employed these as a working fluid. Ideally the working fluid is therefore such an 'environmentally friendly' thermo fluid, such as HFE 7000, although other working fluids may be used depending upon temperature ranges, heat transfer capacity and intended usage of the system. It is also appreciated that a mixture of two or more of the aforementioned fluids with other materials, including nanoparticles, may be used as an improved heat transfer medium.

Ideally at least one engagement means is provided on the mounting structure so as to enable two or more structures to be interconnected and a continuous working fluid pathway to be formed thereby containing the working fluid and preventing it from escaping into the environment.

Preferably the processor monitors amounts of electricity that are generated with respect to demand for electricity; and the controller controls amounts of energy that are stored, and in which storage mode (rechargeable battery or as stored heat energy) having regard to an ambient temperature and/or expected demand. In this sense the processor determines what percentage of incident solar energy is converted to electricity, for immediate use, and what percentage of incident solar energy is stored in the energy storage system.

A by-pass line is provided through which unvapourised fluid passes, if it does not reach vapour conditions so that any unvapourised fluid passes to a condenser. Once the fluid reaches vapour conditions then ideally means is provided to close the by-pass line. Preferably this is performed by way of an automatic valve under control of a processor and subject to at least one input criterion and in accordance with instructions in the form of software, fluid passes through an expander.

Advantageously a regenerator is included at an exhaust of a turbine so as to recover any superheated vapour. Dry fluids are preferred alternatives for use in such cycles. On the other hand, isentropic fluids have so called vertical saturation properties so that the fluid remains saturated at the outlet of the turbine without any liquid droplet occurrence. This feature also eliminates the need for adding additional heat exchanger (regenerator) in the system. Therefore, isentropic fluids are preferred working fluids for ORC applications.

Ideally HFE working fluids with higher latent heat of vaporization lead most of the heat to be added to the fluid during the phase change process in the heat exchanger. This also means that fluid remains in the phase change region and absorbs more energy from the heat source as fluid passes through conduits.

Preferably the conduit is arranged on a support surface in the form of a serpentine matrix. The conduit, which is ideally formed from a metal pipe or tube, is ideally placed on fins that are in contact with a metal clad roof so as to increase the effective area of energy transfer to the conduit.

The conduit passes through a heat exchanger, in the form of a closely packed or tightly woven looped network. Optionally the loop network has fins formed along its length so as to improve effective area of heat transfer in the heat exchanger, either to another working fluid or to the phase change material for the purposes of storing energy for subsequent release.

Fluids with low density results higher volume flow rate and this increases the pressure drop in the heat exchangers. Subsequently pressure drop causes higher pump work input. Also, lower density enlarges the size of the equipment in the cycle, such as expander, condenser and evaporator.

The freezing point of the working fluid is ideally below the lowest temperature point in the cycle. Both liquid and vapour viscosities of the fluid should be low to avoid friction losses in the heat exchangers and maximize convective heat transfer coefficients.

Ideally the mounting includes a support structure on which the matrix of copper pipe conduit is supported. A plurality of flat plate copper or aluminium fins is provided around the copper pipe and in contact with a metallic roof in order to improve heat collection and heat transfer to the pipe and hence the working fluid. Heat transfer processes between the heat source, heat sink and working fluid are highly related to thermal conductivity. The higher thermal conductivity the higher heat transfer coefficients of the fluid which improve heat transfer rates to and from the working fluid.

CFCs ($CClmF4-m$ and $C2ClmF6-m$) were banned in 1995 and HCFC ($CClmFnH4-m-n$ and $C2ClxFyH6-x-y$) m, n, x, y are different from zero and are intended to be banned by 2030 in some countries due to their high ODP and GWP values.

The system employs and operates using a solar powered organic Rankine cycle and has been expressly designed not to operate using CFCs. The system enables efficient use of solar energy for generating mechanical work and heat energy, by way of relatively cheap flat plate solar collectors and use of a novel combination of working fluid, (with low ozone depletion potential (ODP) and global warming potential (GWP)) in combination with an optimised energy storage system. The combined effect of these is to provide a significant decrease in $CO_2$ emissions to the environment and an efficient 'front end' for gathering heat energy.

Preferably a positive displacement expander is used in the closed circuit of the heat transfer system. A positive displacement expander is more efficient at lower temperature cycles such as the desired solar thermal system. It is also cheaper than expensive turbines and traditional ancillary power generation equipment. Preferably the heat transfer coefficient of the fluid and the collector efficiency is optimised by operating a single phase, laminar working fluid flow regime throughout the energy collection phase of the system.

Solar power concentrators may also be used to concentrate rays to a solar receiver and/or a heat engine. Optical concentrators reflect incident solar radiation to a line or point receiver where heat is produced and is transferred to the heat transfer fluid (thermal oil, molten salt, water or air). Optionally the working fluid is transported to a secondary heat exchanger to transfer its heat to water which feeds a heat engine to generate electricity using a generator or dynamo.

Examples of solar power concentrator technologies include: parabolic trough collectors (PTC), linear Fresnel reflectors (LFR), solar power towers and parabolic dish systems. PTCs and LFRs are known as line focus technologies, whereas the solar power tower and dish/engine systems are known as point focus technologies. In point focus technologies, fluid temperature can reach 600° C.-1000° C.; whereas with only in line focus technologies fluid temperature may only reach 400° C.-550° C.

Examples of focussing devices are described below. One such device is the parabolic trough collector (PTC) which concentrates solar radiation and consists of parallel rows of parabolic-banded reflectors. PTCs can produce solar heat at temperatures up to 400° C. Optionally receivers move together with optical concentrators which enable increased energy collection. Actuators may be deployed in order to displace PTCs so as to 'follow' the sun thereby optimising solar collection.

Linear Fresnel collectors (LFC) or reflectors also use line focusing technology similar to PTCs with the exception of using flat or elastically curved mirrors to reflect solar radiation onto a collecting surface (receiver). In use these mirrors are typically mounted close to the ground. Ideally also, receivers are fixed and do not move with respect to the reflectors.

Optionally solar trackers enable tracking of solar radiation by way of a number of fixed, flat (or slightly bent) heliostats. Heliostats are sun-tracking mirrors which reflect solar radiation towards a central receiver located on a fixed tower or platform. However, these add optional and add expense and complexity to the overall system.

Solar energy is transferred to a working (thermal) fluid which passes through the solar receivers. Because higher solar flux is incident on the receivers (solar panels) this type of system can operate at temperatures up to 1000° C. Heat is either converted into electricity by a generator unit attached to the receiver. The generator unit may be a micro-turbine or a Stirling engine.

Electricity generators utilise the Rankine cycle which consists of four components; these are: boiler, steam turbine, condenser and pump. The key stages of power generation are: reversible adiabatic pumping in the pump; constant pressure heat transfer in the boiler; reversible adiabatic expansion in the turbine; and constant pressure heat transfer in the condenser.

Rankine cycle efficiency is closely related to boiler pressure and super heating of the working fluid. An advantage of flat plate collectors is that in use they are stationary and they can be designed for applications which require energy delivery at the sort of temperatures that are encountered in solar collectors.

As mentioned above flat plate collectors offer advantages over concentrating collectors and have the ability to utilize both beam and diffuse solar radiation. Flat plate collectors require little maintenance and do not require solar tracking technology. Therefore, ideally the system employs flat plate collectors which include at least one sheet of glazing, an absorber plate, one or more collector tubes, an insulation medium and a housing or external casing.

When deployed the sheet of glazing is normally glass but may include any other diathermanous material so as to reduce convection and radiation losses from the collector. As solar radiation is transmitted from the sheet of glazing on which it falls.

An absorber plate is ideally flat but may optionally be corrugated or grooved. The absorber plate is ideally formed from a blackened material with a high surface absorptive coefficient.

Solar collectors supply heat to the evaporator where a preferred working fluid such as R245fa is evaporated and turns the turbine to generate mechanical work.

After expansion the fluid passes to an internal heat exchanger where the fluid is preheated. Fluid then condenses in the condenser and is compressed by the pump.

The organic Rankine cycle, which has the same system configuration as conventional Rankine cycle, uses organic substances instead of water as a working fluid. Use of organic substances in the system eliminates many problems, such as the need to superheat to avoid condensation during expansion and corrosion risk. Also, the organic Rankine cycle offers the benefits of a single-stage expander instead of complex and expensive turbines.

An example of an organic Rankine cycle is shown in FIGS. 5a and 5b. The example shown includes a pump, an evaporator; an expander and a condenser used in this system are not different from steam Rankine Cycle. The working fluid passes through four main processes to complete the cycle with the following assumptions.

Ideally the energy storage system comprises: a sealed vessel which contains a continuous fluid pathway having first and second ends, the first end of the continuous fluid pathway is connected to a vessel inlet, the continuous fluid pathway being arranged in the form of a series of substantially parallel sections of fluid pathway, at the end of a parallel section there is a U-shaped return which returns fluid along an adjacent fluid pathway, the second end of the fluid pathway is connected to a vessel outlet.

A working fluid is delivered under pressure to the inlet of the energy storage system, passes through the continuous fluid pathway, around a closed loop and encounters a heating section, whereat the fluid is vaporised. Vaporised fluid then passes through an expander, whereat the fluid does work. The fluid then enters a condenser, whereat further heat is extracted from the working fluid, and is selectively pumped to a heat storage system according to a command signal from an energy management system. Working fluid is then returned to a pump, either from the condenser or from the heat storage system in order to recommence the cycle.

The energy management system operates valves selectively in accordance with inputs supplied by a user as to expected energy demands, from a clock which operates in conjunction with one or more intelligent inputs, from a signal derived from the group comprising: ambient temperature, hours of expected sunshine, amounts of stored energy, immediate and expected energy demands and profit associated with export of generated electricity to a national grid. Some of these are described below.

The fluid pathway is formed from a material with a high thermal conductivity. Ideally the thermal conductivity is greater than 200 W/m·K and preferably greater than 300 W/m·K and ideally greater than 3500 W/m·K. Materials forming the fluid pathway include copper and copper alloys, such as bronze and aluminium bronze.

Ideally a plurality of fins are provided on the substantially parallel sections of fluid pathway. Fins ideally formed from fin portions arranged on, or connected to, the substantially parallel sections of the fluid pathway within the heat storage system. Preferably groups of fins are arranged at right angles one to another so forming a composite fin.

Preferably composite fins comprise four fin portions. However, it will be appreciated that parallel sections of fluid pathway close to, or adjacent, a wall of the vessel may have two or three fins.

Composite fins may be arranged so that fins on adjacent parallel sections of fluid pathway are arranged so that they inter-digitate.

Parallel sections of fluid pathway are packed so that sets of fins on one parallel section of fluid pathway may be offset from a second set of fins on a parallel section of fluid pathway. This spatial arrangement optimises heat transfer from the fluid pathway into the phase change material.

Ideally the vessel contains a phase change media (PCM) which absorbs energy delivered from the fluid pathway and via the fins, in order to store the thermal energy in the form of a temperature rise and/or a phase change.

Preferably the PCM is from the group of materials that includes: a hydrocarbon and/or an ionic salt compound. Even though many ionic liquids are liquid at room temperature, there are some that have phase transition temperatures in a temperature range that makes them suitable for PCMs for storing energy absorbed as latent heat during a phase change. It is understood that the energy management system may be configured to direct thermal energy to be stored in a preferred heat storage system, for example when excess energy storage is required, such as on sunnier days than normal. Such preferred heat storage systems may be larger than normal or they may contain a PCM with particularly high latent heat of fusion ($L_f$).

Optionally electrical energy storage media, such as rechargeable batteries, may be included in the system for storage of excess electricity that is generated during levels of high sunshine and/or where demand for electricity does not exceed supply and/or in situations where thermal energy has been stored to maximum potential in the energy storage system. Alternatively energy may be sold to a third party be exporting it to the national grid.

An energy management device is preferably included in order to manage immediate and expected demands for electricity and heating based on maximum currently available and expected solar energy.

A preferred embodiment of the invention will now be described by way of example only and with reference to the Figures in which:

BRIEF DESCRIPTION OF THE FIGURES

FIG. 5b is a Temperature vs Entropy graph that corresponds to key features in FIG. 5a.

DETAILED DESCRIPTION OF PREFERRED EMBODIMENTS OF THE INVENTION

Figure 1:
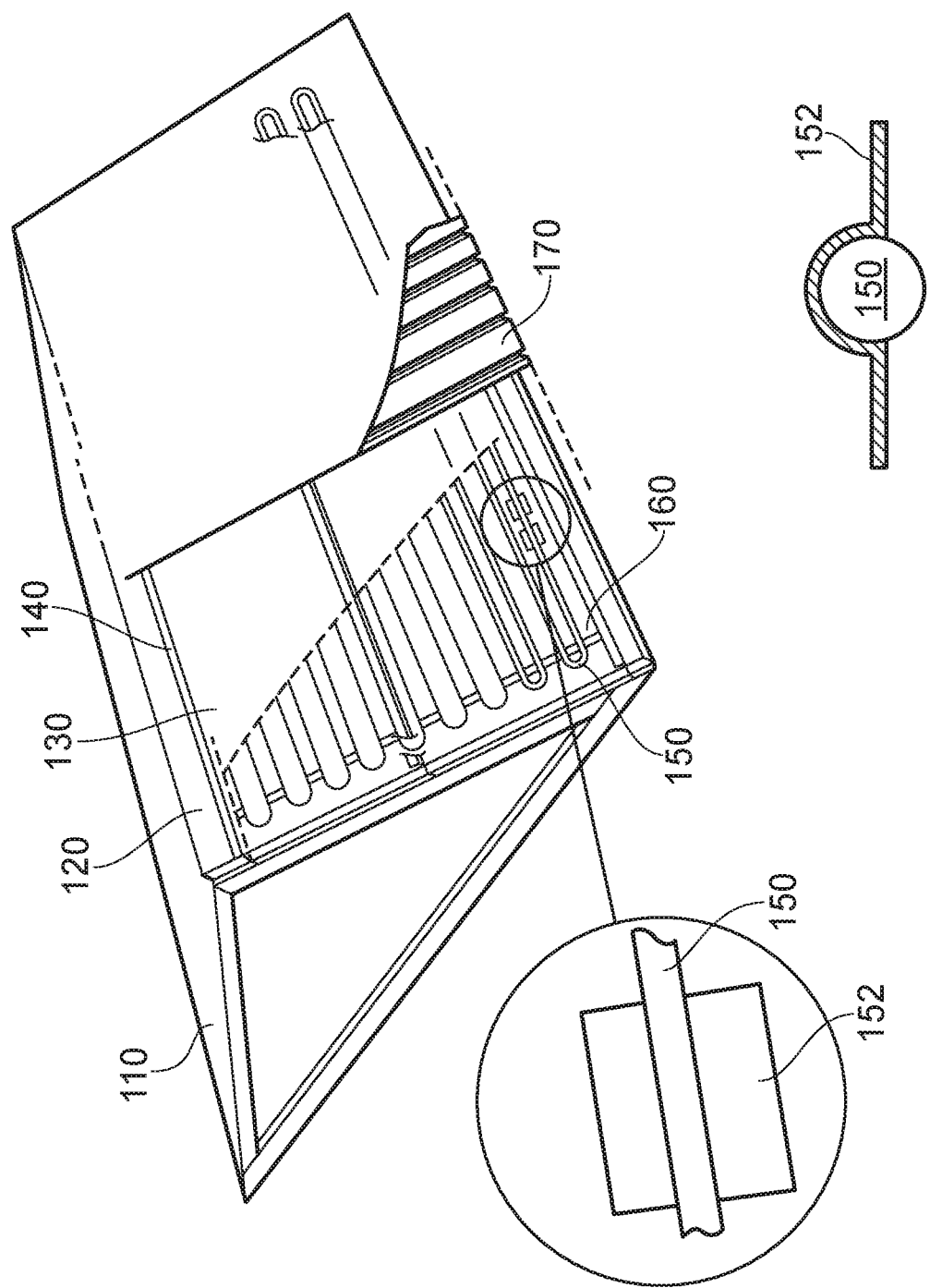
FIG. 1 shows an overall view of a solar collector with partial hidden detail.
Figure 2:
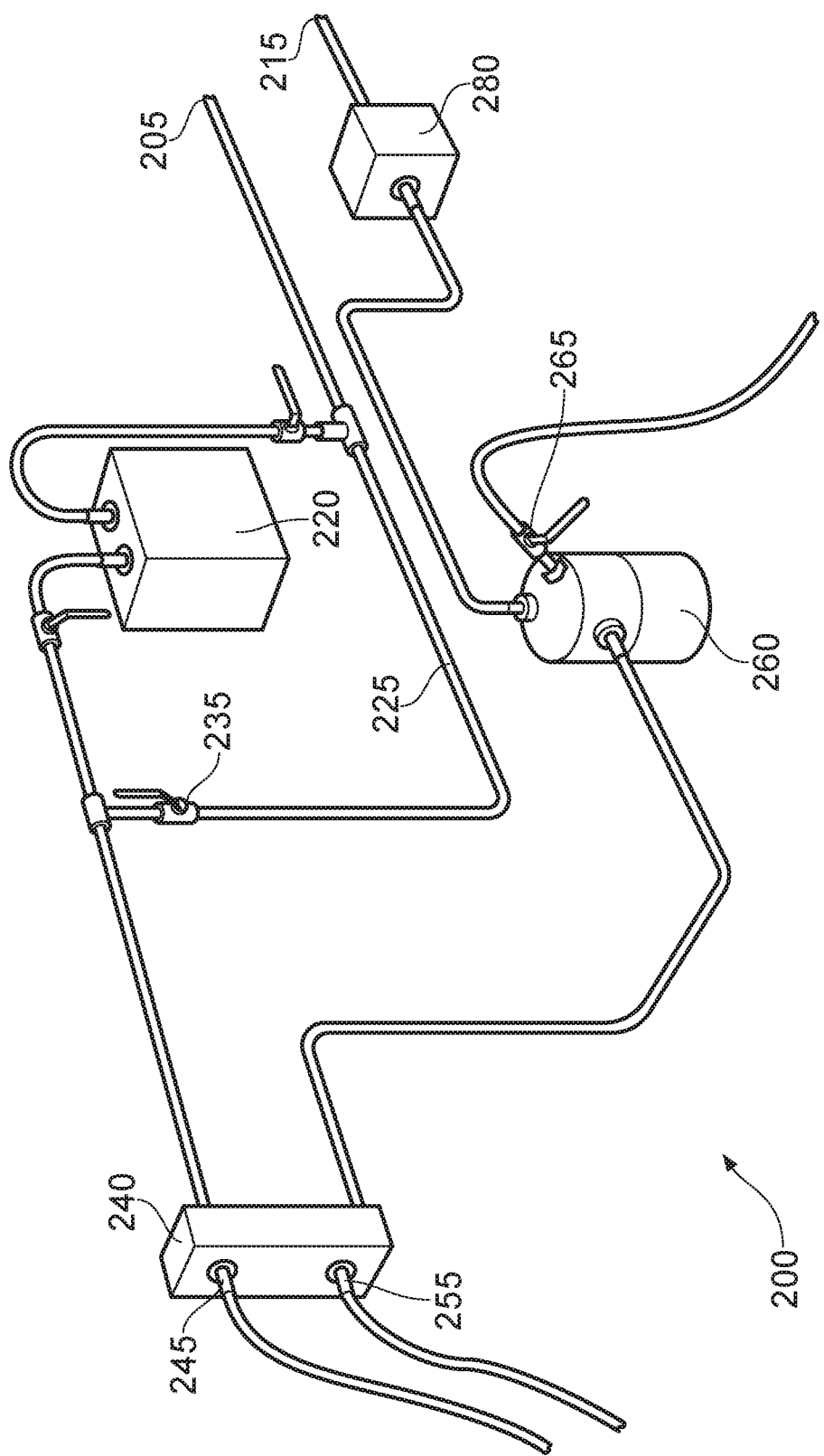
FIG. 2 shows an overall diagrammatical view of a combined energy generation, heat and storage system.

Referring to the Figures generally, there is shown in FIGS. 1 and 2 an example of a solar energy capture and conversion system comprising a solar collector 100 and a combined heat and electrical generating system 200.

FIG. 1 shows a flat plate solar collector 100 which comprises a mounting structure which supports a matrix 130 in which is embedded a conduit 150 containing a thermosefficient working fluid which includes at least one hydrofluoro-ether.

The mounting structure comprises a frame 110, a layer of insulation 120, a plurality of Z-purlins 140, an absorber plate 170 and a sheet of glazing (not shown). The bases of the Z-purlins 140 are supported on the frame 110 and the absorber plate 170 is supported on the upper surfaces of the Z-purlins 140. The sheet of glazing is supported on the absorber plate 170 and the insulation 120 and the matrix 130 are arranged between the frame and the absorber plate 170. The solar collector 100 has a layered structure; the frame 110 is a base, below a lower of insulation 120, which in turn is below the matrix 130, which is below the absorber plate 170 which is below the sheet of glazing.

A solar energy is captured between lower insulating material 120 and the loop of continuous pipe 150 which in use contains the working fluid. Pipe 150 has an enlarged capture surface which may be defined by a fin 152, as depicted in exploded detail in FIG. 2. The fin 152 is supported on an upper surface of insulation 120 and may be used to tack or grip pipe or tubing in place by way of grips (not shown) or adhesion. Extensive gripping is not required as the tubing and fins are enclosed and retained by absorber plate 170 which acts also acts as a roof cladding. Fins 152 are ideally arranged so that fins on adjacent sections of tubing inter-digitate, so enabling a high density of packing of fins and greater heat transfer rates to be obtained.

The absorber plate 170 is a corrugated sheet of stainless-steel or other form of roof cladding which is ideally blackened so as to achieve a low reflectance and to absorb more energy from incident sunlight. The roof cladding or corrugated sheet has a plurality of ridges upon which the sheet of glazing is supported. Pockets of air are therefore defined between the sheet of glazing and the absorber plate. Light which is incident upon the solar collector 100 passes through the sheet of glazing and the absorber plate 170 absorbs the energy such that it is heated. Alternatively, the absorber plate 170 may be planar and the sheet of glazing may contact the absorber plate 170 such that no air gaps exist between the absorber plate 170 and the sheet of glazing.

The sheet of glazing is a sheet of transparent glass which reduces the amount of heat lost from the absorber plate 170 and the solar collector 100 via radiation and convection. Air pockets may act to provide further insulation, so as to prevent heat loss from the solar collector 100. The sheet of glazing may include any other diathermanous material.

Referring to FIG. 2 the matrix 130 is arranged to fill the space between the absorber plate 170 and the layer of insulation 120. Embedded within the matrix 130 are conduit 150 and clamps 160. The conduit 150 is a copper tube through which the working fluid passes. As absorber plate 170 is heated by absorbing incident radiation, the matrix 130 conducts heat from the plate 170 and the conduit 150 conducts heat from the matrix 130. The working fluid is then heated as it is passes through the conduit 150. Heat loss through the bottom surface of the matrix 130 is minimised by the layer of insulation 120.

The conduit 150 is arranged in a serpentine configuration with parallel lengths extending parallel to the Z-purlins 140 connected by curved portions adjacent the end of the solar collector 100. This arrangement allows the conduit 150 to cover a large area of the solar collector 100 and maximise the efficiency with which heat absorbed by the absorption plate 170 is transmitted to the working fluid. An advantage of this arrangement is that linear thermal expansion of tubes is accommodated. Alternatively, the conduit 150 may be arranged as a pair of parallel headers arranged along opposite edges of the collector 100 with a plurality of risers arranged between them such that multiple paths are available for the fluid. However, at low flow rates the header and riser configuration can result in a poor flow distribution which reduces the efficiency of the collector 100.

The working fluid passing through the conduit is ideally a laminar flow. Increasing the mass flow rate of the working fluid leads to an increase in the Reynolds number. This may lead to the working fluid transitioning from a laminar flow to a turbulent flow. A turbulent flow has a greater heat transfer coefficient and more heat is transferred to the working fluid.

Additional insulation may be provided around the sides of the matrix so as to further reduce heat loss from a collection zone. For a fully developed single-phase laminar flow in a circular tube, the Nusselt number (the ratio of convective to conductive heat transfer across a boundary) is constant and independent of the Reynolds and Prandtl numbers.

Referring to FIG. 2 clamps 160 are bars which are arranged perpendicular to the straight portions of the conduit 150 with apertures or notches arranged to receive portions of the conduit 150 so as to hold the conduit 150 rigidly in the correct serpentine arrangement. The clamps 160 are also rigidly attached to the surface of the layer of insulation 120 so as to rigidly locate the conduit 150 and the matrix adjacent to the insulation 120.

The Z-purlins 140 are arranged to support the absorption plate 170, they are arranged on the frame 110 and pass through slits in the layer of insulation 120 and through the matrix 130. Apertures or slots are formed in the Z-purlins 140, through which the curved portions of the conduit 150 pass such that the conduit 150 can span the entire surface.

In use, the working fluid is pumped into the solar collector 100 at high pressure, as the fluid continues along the conduit 150 it is heated and its mean temperature increases. This continues until the working fluid reaches its boiling point. This is called liquid single-phase flow and corresponds to 29% of the total length of the collector tube.

As the fluid continues along the conduit 150 it is heated until it reaches its saturation point, where the rate at which molecules transition from liquid to vapour is equal to the rate at which molecules transition from vapour to liquid. This is depicted as pathways 2 and 3 in FIGS. 5*a* and 5*b*. At pathway 2 liquid, at temperature $T_1$ boils and heats to $T_2$. Beyond this point the mean temperature remains constant and the fluid passing through the conduit is a multiphase flow which undergoes flow boiling. The boiling region occupies 58% of the conduit. During the flow boiling phase the heat gain of the working fluid also increases and this heat is used to generate vapour in the tube.

The fluid completely transitions into a saturated vapour at the end of the flow boiling region. Beyond $T_2$, (FIG. 5*b*) as fluid gains more heat its temperature increases to $T_3$. The saturated vapour then becomes a superheated vapour. This region is called the vapour single-phase flow and continues until the working fluid exits the solar collector 100. The fluid temperature reaches 26.3° C. and exits the solar collector as a superheated vapour.

First and second valves (not shown) are arranged to open and/or close respective first and second ports (not shown). These valves are located at opposite ends of the conduit 150 through which the working fluid passes through the solar collector 100. In use these valves regulate the flow of the working fluid between the solar collector 100 and the combined heat and electrical generating system 200. Working fluid passes from the generating system 200 through the first valve, along the conduit through the solar collector 100 through the second valve and back to the generating system 200.

Alternatively, multiple solar collectors 100 may be connected such that working fluid passes from the generating system 200, through all of the collectors 100 in succession and then returns to the generating system 200.

The solar collector 100 is in a direct vapour generation (DVG) configuration, where the working fluid is heated directly in the solar collector. Alternatively, a heat transfer fluid (HTF) configuration may be used, where the working fluid is heated in a heat exchanger.

The solar collector 100 shown in FIG. 1 is a flat plate solar collector, alternatively, a compound parabolic solar collector or an evacuated tube solar collector may be used.

Optical concentration devices may be used to concentrate light on the solar collector or collectors 100. However, concentrated systems are only able to harness direct beam radiation, and therefore diffuse radiation does not contribute to the heating of the working fluid.

Figure 5B:
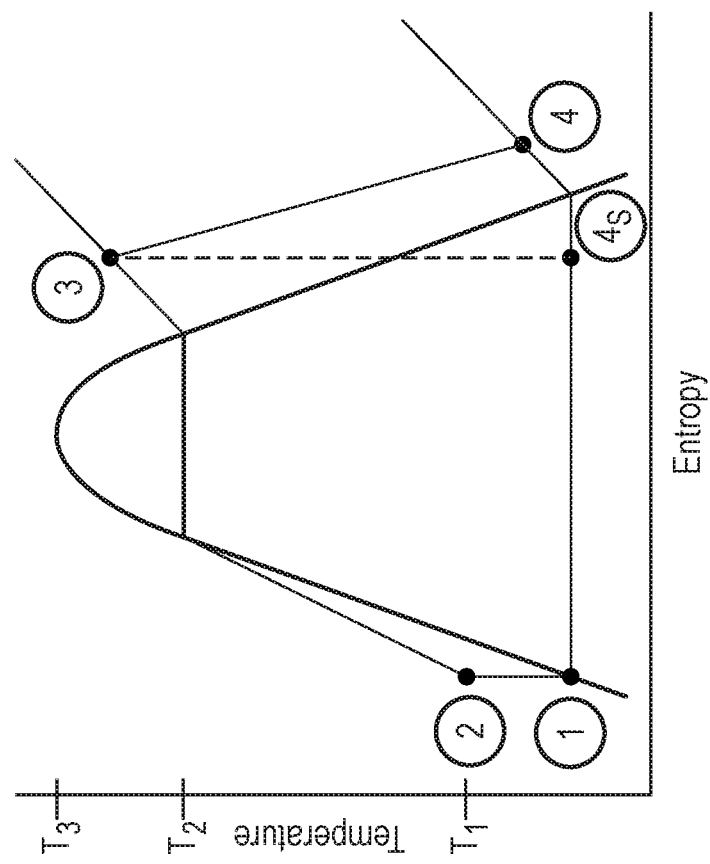
Figure 5A:
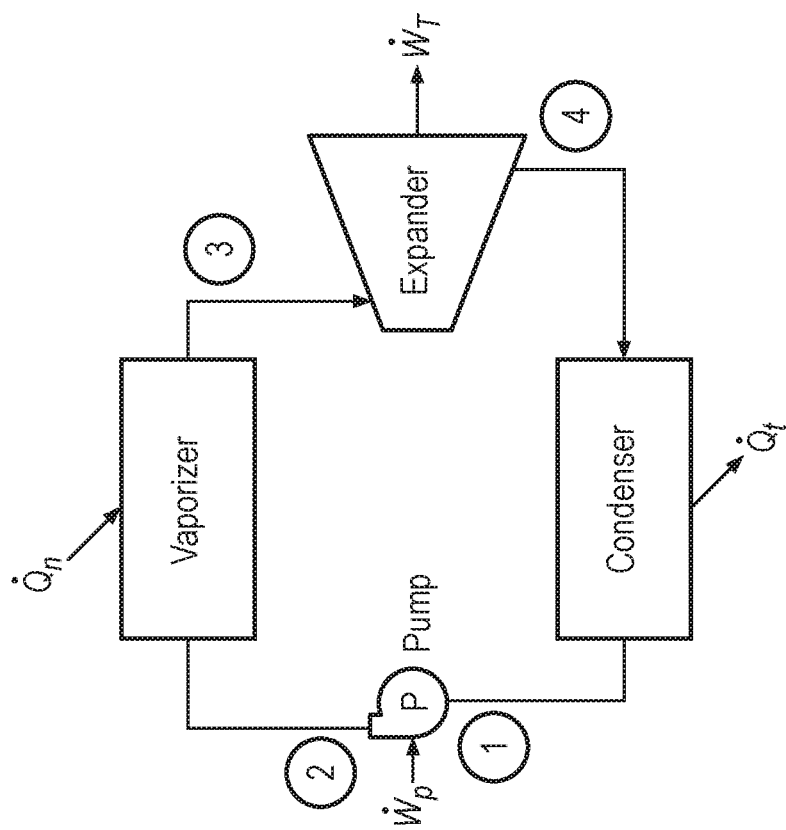
FIG. 5a is a diagram illustrating an example of key components of an organic Rankine cycle.

FIG. 2 shows a combined heat and electrical generating system 200 which performs an organic Rankine cycle, as illustrated in FIGS. 5*a* and 5*b*. The system comprises an expander 220, a condenser 240, a reservoir 260 and a pump 280. In use, the combined heat and electrical generating system 200 is operatively connected to solar collector 100 or another device which transfers heat to a fluid at high pressure such that the generating system and the solar collector define a closed circuit for a working fluid.

In use, working fluid is pumped from the reservoir 260 through a first port 215 into the solar collector 100; within the solar collector 100 the working fluid is heated and is vaporised; the working fluid then returns to the generating system 200 through a second aperture 205 and enters the expander 220; the working fluid expands within the expander 220, thereby driving a generator; the working fluid continues at a lower pressure to the condenser 240; within the condenser heat is transferred away from the working fluid, thereby cooling and re-condensing it; the working fluid is then continues to the reservoir 260.

In an idealised cycle, the working fluid undergoes isobaric heating within the solar collector 100, isobaric cooling within the condenser 240 and isentropic compression within the pump 280. The working fluid leaves the condenser 240 and is stored within the reservoir 260 as a saturated fluid or as a sub-cooled fluid; therefore it is either a liquid, or a liquid or vapour at its liquid-vapour equilibrium.

The pump 280 is a circulation pump which acts to drive the working fluid around the closed system and to pressurise the fluid passing from the reservoir 260 to the solar collector 100 from low to high pressure.

Within the solar collector 100 thermal energy is added to the working fluid at a high, pressure. As the working fluid gains energy, the temperature of the fluid increases and it transitions into a vapour.

Within the expander 220 the vaporised working fluid expands, thereby rotating the expander shaft and transferring mechanical energy to a generator and generating an electrical current.

Condenser 240 is a water cooled condenser. The working fluid which passes through the condenser is condensed from a vapour to a saturated fluid or a sub-cooled fluid by transferring thermal energy to water which passes through the condenser from an inlet 245 to an outlet 255. This decreases the temperature of the working fluid and extracts energy from the system in the form of heat.

The condenser 240 is a brazed type plate heat exchanger. Blazed heat exchangers consist of a stack of thin plates which are blazed together and expose the fluids to a larger surface area.

The condensed working fluid is stored within the reservoir 260 until it is depressurised and recirculated by the circulation pump. The circulation pump 280 may be a positive displacement pump. Positive displacement pumps are well suited for use in organic Rankine cycles because they are able to operate at lower flow rates and desirable pressure ratios. Alternatively, for larger organic Rankine cycles, centrifugal pumps may be used because they may provide a greater flow rate when desired.

A flow control method may be used to regulate the flow rate of the pump, the flow control method may comprise: a flow control valve; a by-pass control and/or a variable frequency drive (VFD).

The expander 220 may be a velocity type expander; velocity type expanders include axial or radial turbines. Alternatively, the expander may be a volumetric type or positive displacement expander; volumetric type expanders include scroll expanders, screw expanders, reciprocating piston expanders and rotary vane expanders.

A positive displacement type expander is ideal for an organic Rankine cycle due to its lower rotational speed, ability to operate under large pressure ratios and its good performance.

Radial turbines, screw expanders and reciprocating piston expanders are better suited for larger applications, and scroll expanders and rotary vane expanders are better suited for medium or small scale applications. The reservoir 260 provides a steady supply of working fluid to the circulation pump and provides a buffer which prevents any vapour which passes through the condenser without re-condensing from causing a cavitation within the pump. The reservoir may be a twelve litre vertical liquid reservoir.

An inlet valve 265 is provided on the reservoir, through which working fluid enters the system. This is used to ensure that the system is sufficiently charged with working fluid. If the system is undercharged, pressures which are sufficient to achieve the optimum efficient of the system may not be achievable.

An expander by-pass line 225 is provided. Working fluid which passes through the solar connector without being vaporised passes through the by-pass line instead of passing through the expander, the un-vaporised working fluid then continues to the condenser. A valve 235 is provided which regulates the flow through the by-pass line; once the working fluid leaving the solar collector reaches vapour conditions (such as when the solar collector reaches a threshold temperature) the by-pass line is closed and the entirety of the working fluid which exits the solar collector passes through the expander. Valves are also provided to block a flow through the expander.

Additional pumps may be arranged around the system so as to ensure that desired pressures are maintained.

K-type thermocouples 1000 are arranged to monitor the temperature of the working fluid and the condenser water as they travel around the system. Thermocouples 1000 are positioned at the inlet to the solar collector, the inlet to the expander, the inlet for the working fluid to the condenser, the inlet to the reservoir and the inlet and outlet for the water to and from the condenser.

Pressure sensors (not shown) may be positioned at the inlets to the solar collector, the expander, the reservoir and the pump. These may be used to monitor the pressure of the working fluid as it is transmitted around the system. These may be digital pressure transmitters or analogue pressure gauges.

Flow meters may also be installed in the system in order to monitor the flow rate of the working fluid around the system.

The working fluid is hydro-fluoro-ether 7000, which has chemical formula $C_3F_7OCH_3$ and is 99.5% by weight 1-methoxyheptafluoropropane. HFE-7000 has molecular weight 200 g/mol, boiling point 34° C. at 1 atmosphere, liquid density 1400 kg/m$^3$, critical temperature 165° C., critical pressure 2.48 MPa, latent heat of vaporization 142 kJ/kg, specific heat 1300 J/kgK, and kinematic viscosity 0.32 cSt.

Advantageously HFE-7000 has a lower boiling point, higher latent heat of vaporization, higher density and higher molecular weight than water. Furthermore, HFE-7000 is non-flammable, non-corrosive and is compatible with many materials, including stainless steel, copper, aluminium, polypropylene, polyethylene and nylon.

HFE-7000 is a dry fluid (it has a positively sloped saturation vapour curve) therefore it is in a dry vapour state at the end of its expansion and does not contain any liquid droplets. This is advantageous as liquid droplets could damage turbine blades or other moving parts within the expander. If a wet (negatively sloped saturation vapour curve) working fluid was used, it would need to be superheated before it entered the expander.

A dry fluid ends its expansion strongly overheated; therefore excessive superheating of the fluid does not have any significant contribution to the efficiency of the system. The strongly overheated exhaust from the expander increases the cooling load on the condenser. Therefore preferably a condenser with a large heat transfer area is used. Dry fluids tend only to need smaller unit aperture areas than wet fluids (with the exception of ammonia).

The pipes or tubes which make up the conduit in the solar collector and the fluid passageways between the various components of the generating system are connected and integrated using compression fittings so as to prevent any leaks of the working fluid.

Figure 3:
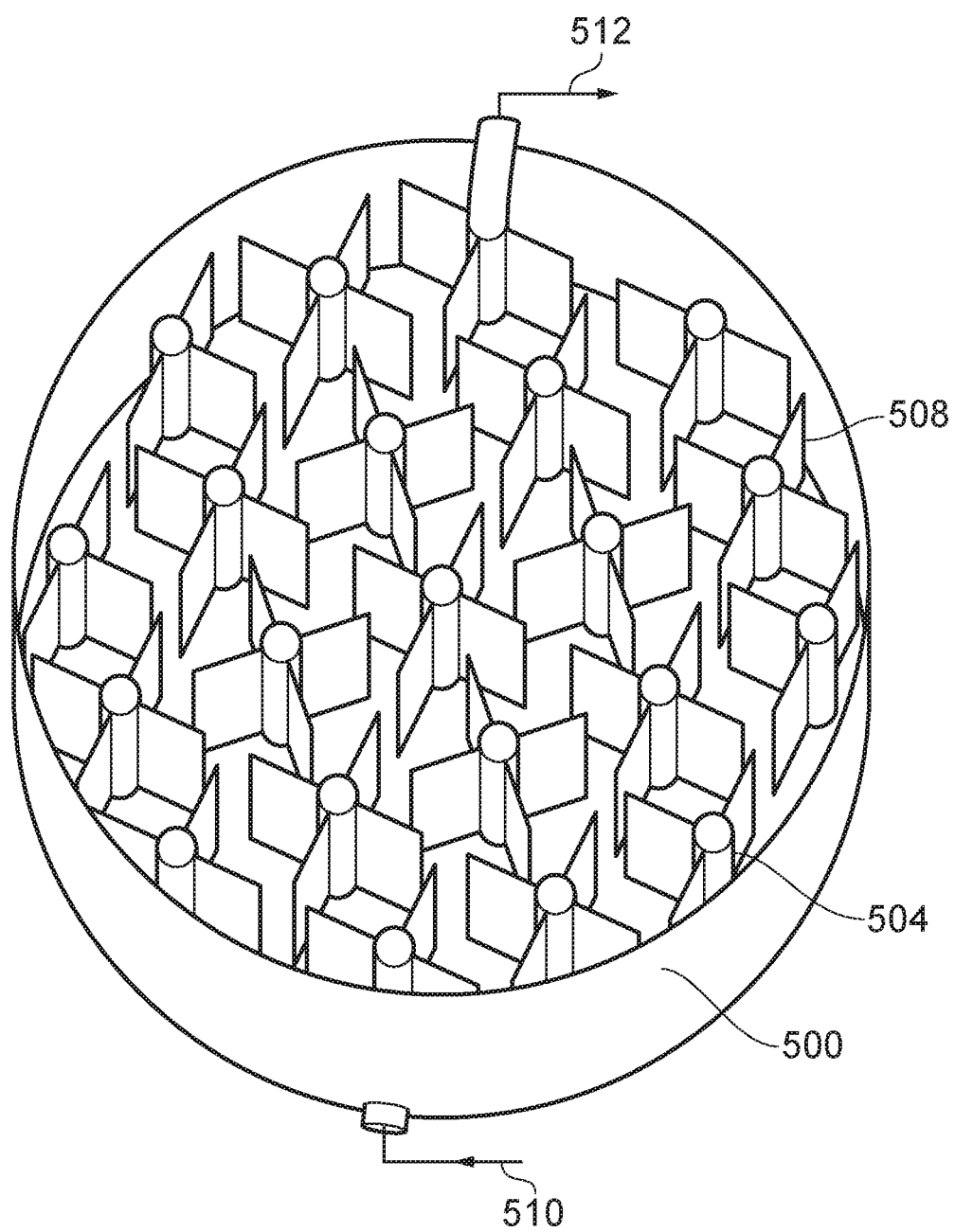
FIG. 3 is an overall, partial diagrammatic view of one type of heat exchanger, that is used as part of an energy storage and recovery system that may include a phase change medium (PCM)
Figure 4:
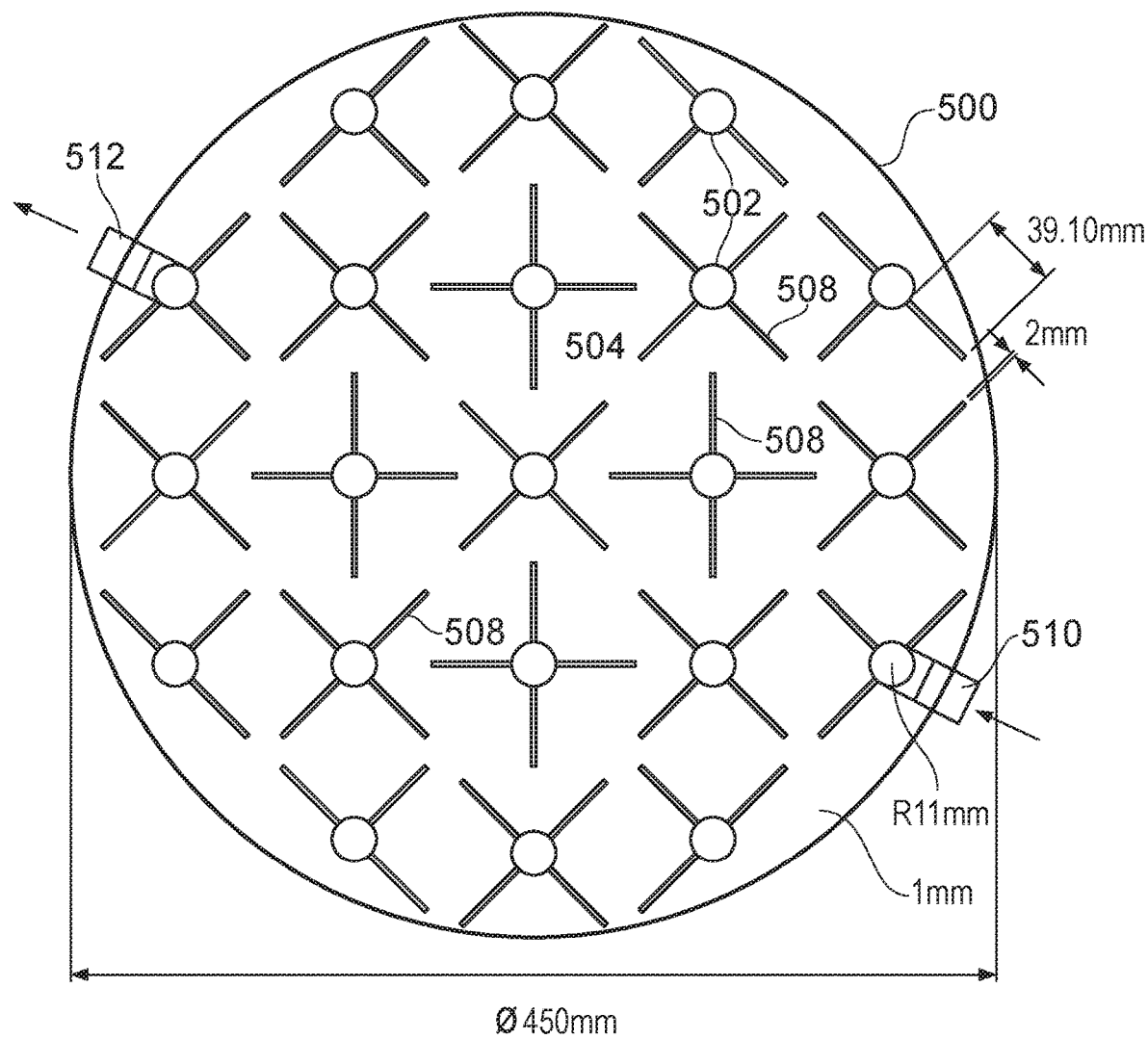
FIG. 4 is an overall sectional view of the heat exchanger in FIG. 3.

Referring to FIGS. 3 and 4 show partial views of the thermal energy storage system 500. Materials that can store thermal energy reversibly over a long time period are referred to as latent heat storage materials from the working fluid as it passes through tubes 502. The release of the stored energy is typically initiated by a seed crystal which starts a crystallization process of a super cooled medium. In turn this reaction releases stored energy which may be released in the form of heat; for example by way of air being directed across an outer surface of the energy storage system 500 in order to extract stored thermal energy or for example via a suitable heat exchange into a fluid that transfer the stored heat to a radiator. The solar energy capture and conversion system may therefore be modified for water heating, and/or space heating/cooling.

An example of latent heat storage is use of a crystallization of a saturated salt solution initiated by mechanically deforming a bending a small metal plate which initiates a phase change which is exothermic.

Similar to latent heat storage media are phase change media (PCMs) which store energy on the phase transition from solid to liquid and release the stored energy in the reverse transition from liquid to solid.

Referring in detail to FIGS. 3 and 4 there is shown a section through an energy storage system 500. A fluid pathway 502, formed from relatively closely packed tubes 504. The tubes form a continuous fluid pathway which acts as a heat exchanger 500 formed from the closely packed tubes. The closely packed tubes 504 are arranged in a matrix or array and are formed from a single continuous fluid pathway that is housed in a sealed vessel 501.

The fluid pathway 504 is connected to a vessel inlet 510 and a vessel outlet 512. The fluid pathway 504 is in the form of a series of substantially parallel sections of fluid pathway, at the end of a parallel section there is a U-shaped return (not shown) which returns fluid along an adjacent fluid pathway. The fluid pathway 504 is formed from a material with a high thermal conductivity, such as copper or copper alloy.

Fins 508 are provided on the substantially parallel sections of fluid pathway 504. Fins 508 are ideally from fin portions formed on, or connected to, the fluid pathway 504 at right angles one to another so forming a composite fin.

Preferably composite fins comprise four fin portions. However, it will be appreciated that parallel sections of fluid pathway close to, or adjacent, a wall of the vessel may have two or three fins.

Composite fins may be arranged so that fins on adjacent parallel sections of fluid pathway are arranged so that they inter-digitate. Parallel sections of fluid pathway are packed so that sets of fins on one parallel section of fluid pathway may be offset from a second set of fins on a parallel section of fluid pathway. This spatial arrangement optimises heat transfer from the fluid pathway into the phase change material.

Vessel 500 contains a phase change media (PCM) which absorbs energy delivered from the fluid pathway and via the fins, in order to store the thermal energy in the form of a temperature rise and/or a phase change. A fan (not show) may blow air across external fins (not shown) in order to recover stored energy and recycle this as warm air around a house or office.

Preferably the PCM is from the group of materials that includes: a hydrocarbon and/or an ionic salt compound.

In order to increase the system performance additional components and/or modifications may be incorporated into the system. For example, increasing the area of the heat source of the system by way of collecting another flat plate collector to the current collector. These features enhance effective collector area, as well as the amount of the solar radiation collected.

Figure 6:
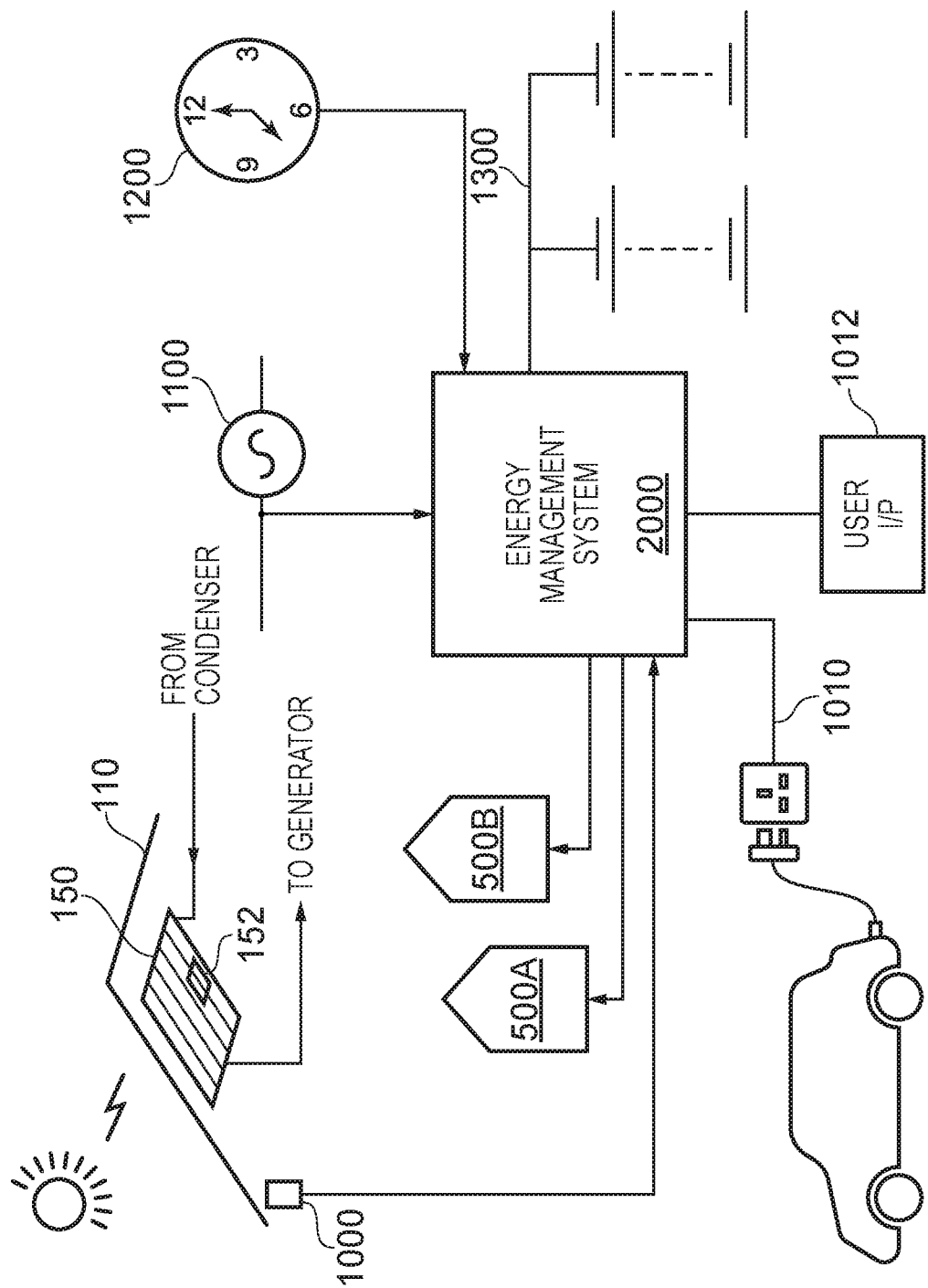
FIG. 6 is an overall diagrammatic view of an energy monitoring and control system for the combined energy generation, heat and energy storage system shown in FIG. 2.

Referring to FIG. 6, there is shown an overall diagrammatic view of the aforementioned solar energy capture, energy conversion and energy storage system comprising: means for generating, storing, distributing electrical energy, as well as an energy management systems 2000 for monitoring and controlling the generation, storage and distribution.

The system comprises a solar energy capture and conversion system 100 as described above, with flat plate collector 100 supported by a frame 110, within which a conduit 150 is embedded; and a combined heat and electrical generating system 200 comprising an electrical generator, and a condenser 240. A working fluid comprising at least one hydrofluoro-ether is heated in the conduit 150, passes through the generating system 200 wherein the thermal energy in the working fluid is converted to electrical energy in the generator, and extracted to a second working fluid in the condenser 240.

The generator acts as an AC source 1100 which generates electricity and provides it as an input to the energy system. The condenser 240 extracts thermal energy from the working fluid to a second working fluid, which transfers the thermal energy from the condenser and the original working fluid to a thermal energy storage system 500 as described above.

The thermal energy storage system 500 may be configured to receive heat from other sources in addition to the solar capture system 100 and/or may be configured to output heat to other components of the energy system. For example, the thermal energy storage system may be configured to provide heat to an additional working fluid by acting as a heat exchanger, which may in turn be used to provide heating directly, for example, in a domestic radiator (not shown) or may be used to generate electricity (for example, in a generator). In some embodiments, water may be passed through a heat exchanger in the thermal energy storage system so that it is heated.

In the illustrated embodiment in FIG. 6, the thermal energy storage system 500 comprises a plurality of individual thermal energy storage system devices 500A, 500B.

The storage of energy within the thermal energy storage system 500, and the extraction therefrom may be controlled by, connected to, and/or integrated with the energy management system 2000.

The energy management system 2000 controls valves which permit unheated water or other working fluid to flow through the thermal energy storage system 500 in order to extract heat therefrom. Valves also may be employed to allow heated working fluids (for example, fluids heated by the solar heating panel 100, or heated by some electrical heater) to flow through the thermal storage system 500 in order that they can transfer thermal energy to the PCM contained therein. In other embodiments the energy management system oversees and controls the proportion of thermal energy that is converted to electricity and how much is used to heat the PCM in the thermal energy storage system 500.

The energy management system 2000 receives a signal from the generator 1100 and also receives signals indicative of levels of electricity being produced. The energy management system includes: a processor in the management system 2000, that is adapted to sense the level of incident solar radiation and levels of electricity being generated, so that an amount of energy that is stored is in dependence of available energy and/or expected demand of energy. The processor determines what percentage of incident solar energy is converted to electricity, for immediate use and what percentage of incident solar energy is stored in the energy storage system.

Optionally the processor determines what percentage of electricity generated is used to charge one or more rechargeable batteries 1300. The processor receives inputs from at least: a local thermometer 1000; a user energy request which indicates how much electrical energy is required; and a means which indicates levels of energy stored. In one embodiment the processor receives a command signal from a remote mobile communication device 1012, such as mobile telephone (cellphone), operating in accordance with instructions in an application specific software (APP).

Energy may be supplied from one or more other sources (such as additional generators 1100 powered by additional solar systems 1100, generators powered by other means, such as one or more wind turbines, and/or from a national or local electrical grid).

The energy management system 2000 is operable to distribute electricity it receives to outputs where electricity is required, and/or use this electricity to charge energy storage means which may be thermal, such as a conventional storage heater, and/or electrical storage means.

In the illustrated energy system, energy management system 2000 is connected to electrical energy storage means 1300 comprising a plurality of batteries. Alternatively, or additionally the energy system may comprise other energy storage means. These energy storage means may be mechanical (such as compressed air energy storage, or gravitational energy storage such as pumped hydroelectricity storage), may be electrochemical (such as a rechargeable battery), may be thermal (such as a storage heater or PCM energy storage), and/or may be electrical (such as superconducting magnetic energy storage). The energy management system 2000 may selectively distribute to electricity to any of a plurality of outputs. Outputs may include electrical sockets, electrical appliances or systems comprised by or connected to the energy management system (such as lighting, or electrical heaters), and/or to external systems to which electricity may be provided (for example electricity may be provided to an electrical grid).

The energy management system 2000 illustrated in FIG. 6 is connected to outputs including an electrical car charging station 1010 or to a terminal (not shown) to an external electricity supply or grid.

The energy management system 2000 may control, activate or deactivate energy generating means comprised by the system. For example, the energy management system 2000 may control the output of the generator and/or may control the rate at which the working fluid is pumped around the system. Furthermore there may be times when the energy management system 2000 determines whether or not, and at what rate, energy is supplied, and in what form (electrical or thermal) to one or more users or to one or more energy storage media.

In addition to the inputs by which the energy management system 2000 receives electrical energy, the energy management system 2000 has inputs which provide signals which may be used to control the energy management system 2000. The energy management system 2000 may use these signals to determine how to control the other components of the energy system and/or how to distribute electricity from its various inputs and/or storage means of energy to its various outputs and/or storage means for energy.

In the energy system illustrated in FIG. 6 the energy management system 2000 receives control signals from a K-type thermocouple 1000 at the solar collector 100, a clock and timing system 1200 and a user input means 1012.

The energy management system 2000 may also receive or deduce control signals from other components of energy system, or systems to which the energy system is connected (for example, the rate of electricity generation of a generating means, the demand on or current pricing on an electrical grid, the current level of charge in an energy storage means such as a battery, and/or the level of demand on the energy systems' electrical outputs). The energy management system 2000 may also receive control signals from other energy management systems to which it is connected (for example a central heating system).

The energy management system may automatically activate, deactivate and/or control specific electrical outputs (or electrical appliances connected thereto) in response to specific control signals, or as a result of a combination of signals or other measured parameters. For example, heating and/or air conditioning may be activated, deactivated or modified depending upon control signals indicating the temperature, the time of day, current and/or predicted weather, humidity, and/or a user's manual selection.

The energy management system 2000 may also be configured to send signals, for example to other energy management systems, or to a user (such as to a user control means or to a user's communication means such as a smartphone or email account).

A user control means may be an integrated control means such as a control panel, or may be a means for receiving remote and/or wireless signals from a discrete control means such as a remote control, or a user's computer or smartphone. In some embodiments, the energy management system may be capable of receiving commands from a user by existing communication means (such as email or SMS text messages), in other embodiments specific or dedicated software (such as a smartphone APP) may be used to control the system.

The energy system and or the energy management system 2000 may be integrated with one or more buildings such as a house, or an office. Optionally some or all of the electrical inputs (such as generating means or electrical grid connections), storage means (such as PCM thermal storage or batteries), and/or electrical outputs (such as electrical sockets or appliances) comprised by the building may be connected to, integrated with, controlled by, and/or monitored by the energy management system.

The invention has been described by way of examples only and it will be appreciated that variation to the aforementioned embodiments may be made without departing from the scope of the claims.

The invention claimed is:

1. A solar energy capture, energy conversion and energy storage system comprises:
   a mounting structure which supports an embedded conduit which in use receives a working fluid which includes at least one hydro-fluoro-ether;
   first and second valves are operative to open/close first and/or second ports in at least one fluid pathway leading from the conduit to an electricity generating system and/or to an energy storage system, the working fluid in the generating system passes through a heat exchanger in order to transfer its heat to drive a generator (dynamo);

the energy storage system includes:

a sealed vessel for containing a phase change material (PCM), which in use receives and stores heat energy, and a continuous fluid pathway leads from a vessel inlet to a vessel outlet, the continuous fluid pathway is arranged in a form of a plurality of substantially parallel sections of the fluid pathway, at an end of each of the parallel sections of the fluid pathway there is a U-shaped return which returns the working fluid along an adjacent one of the parallel sections of the fluid pathway so that, in use, the working fluid passing along the continuous fluid pathway transfers its heat energy to the PCM; and an energy management system controls operation of the first and second valves so as to selectively generate electricity or to store heat, the energy management system including a processor adapted to determine what percentage of incident solar energy is converted to electricity for immediate use and what percentage of the incident solar energy is stored in the energy storage system.

2. The system according to claim 1 wherein the working fluid includes HFE 7000.

3. The system according to claim 1 wherein the processor is further adapted to sense a level of incident solar energy and a level of electricity being generated, so that an amount of energy that is stored is in dependence on available energy and/or expected demand of energy.

4. The system according to claim 1 wherein the processor determines what percentage of electricity generated is used to charge one or more rechargeable batteries.

5. A solar energy capture, energy conversion and energy storage system, comprising:

a mounting structure which supports an embedded conduit which in use receives a working fluid which includes at least one hydro-fluoro-ether;

first and second valves are operative to open/close first and/or second ports in at least one fluid pathway leading from the conduit to an electricity generating system and/or to an energy storage system, the working fluid in the generating system passes through a heat exchanger in order to transfer its heat to drive a generator (dynamo);

the energy storage system includes:

a sealed vessel for containing a phase change material (PCM), which in use receives and stores heat energy, and a continuous fluid pathway leads from a vessel inlet to a vessel outlet, the continuous fluid pathway is arranged in a form of a plurality of substantially parallel sections of the fluid pathway, at an end of each of the parallel sections of the fluid pathway there is a U-shaped return which returns the working fluid along an adjacent one of the parallel sections of the fluid pathway so that, in use, the working fluid passing along the continuous fluid pathway transfers its heat energy to the PCM; and an energy management system controls operation of the first and second valves so as to selectively generate electricity or to store heat, the energy management system including a processor adapted to sense a level of incident solar energy and a level of electricity being generated, so that an amount of energy that is stored is in dependence on available energy and/or expected demand of energy, and to receive inputs from at least: a local thermometer; a user energy request which indicates how much electrical energy is required; and a means which indicates a level of energy stored.

6. The system according to claim 5 wherein the processor receives a command signal from a remote mobile communication device operating in accordance with instructions in an application specific software (APP).

7. The system according to claim 1 wherein at least one engagement means is provided on the mounting structure so as to enable two or more of the mounting structures to be interconnected.

8. The system according to claim 1 further comprising a positive displacement expander in the system to drive the generator (dynamo).

9. The system according to claim 1 wherein at least two of the energy storage systems are provided, the at least two of the energy storage systems containing different phase change materials (PCM) for thermal storage.

10. The system according to claim 1 further comprising a working fluid by-pass line through which unvaporized working fluid passes to a condenser.

11. The system according to claim 10 further comprising a shutoff valve which isolates the by-pass line when the working fluid reaches vapour conditions.

12. The system according to claim 1 wherein the mounting structure includes:

a support structure on which a matrix of copper pipe forming the fluid pathway is supported and a plurality of fins is provided under the pipe in order to improve heat collection and heart transfer to the pipe.

13. The system according to claim 1 wherein the mounting structure comprises a frame with a layer of insulation laid thereon, a plurality of purlins is supported by the frame and is overlaid with a sheet of glazing.

14. The system according to claim 13 wherein an absorber plate is supported on an upper surface of the plurality of purlins;

the sheet of glazing is supported on the absorber plate; and a layer of insulation is arranged between the frame and the absorber plate.

15. The system according to claim 1 further comprising fins provided on the parallel sections of the fluid pathway for improving heat transfer between the phase change material and the working fluid.

16. The system according to claim 15 wherein the fins are in a form of fin portions formed on, or connected to, the fluid pathway so as to define a composite fin.

17. The system according to claim 1 further comprises a meter for measuring an amount of charge that is transmitted to an external electricity supply.

18. The system according to claim 1 further comprises a charger adapted to charge a battery of a vehicle, or an electric bicycle.

* * * * *